United States Patent [19]

Sasaki et al.

[11] 4,293,492
[45] Oct. 6, 1981

[54] DISAZO COMPOUNDS DERIVED FROM 3,6-BIS(STYRYL)-9-ETHYLCARBAZOLE

[75] Inventors: Masaomi Sasaki, Kawasaki; Kiyoshi Sakai, Tokyo; Mitsuru Hashimoto, Hino; Masafumi Ohta, Yokohama; Kyoji Tsutsui, Tokyo, all of Japan

[73] Assignee: Ricoh Co., Ltd., Tokyo, Japan

[21] Appl. No.: 152,061

[22] Filed: May 20, 1980

Related U.S. Application Data

[62] Division of Ser. No. 921,086, Jun. 30, 1978, Pat. No. 4,251,614.

[30] Foreign Application Priority Data

Jul. 5, 1977 [JP] Japan .................................. 52-80116
Jul. 8, 1977 [JP] Japan .................................. 52-81791

[51] Int. Cl.³ .......................... C09B 35/24; C09B 35/34
[52] U.S. Cl. .................................. 260/160; 260/141; 260/164; 260/315
[58] Field of Search .............................. 260/160, 164

[56] References Cited

U.S. PATENT DOCUMENTS

| 2,774,755 | 12/1956 | Schmid et al. | 260/174 |
| 2,897,186 | 7/1959 | Miller et al. | 260/164 X |
| 3,966,703 | 10/1976 | Heinrich et al. | 260/164 X |
| 3,984,199 | 6/1976 | Bleck et al. | 260/160 X |

FOREIGN PATENT DOCUMENTS

| 555556 | 9/1957 | Belgium | 260/164 |
| 744302 | 11/1943 | Fed. Rep. of Germany | 260/160 |
| 1326767 | 4/1963 | France | 260/160 |
| 54-155227 | 5/1978 | Japan | 260/164 |

*Primary Examiner*—Floyd D. Higel
*Attorney, Agent, or Firm*—Blanchard, Flynn, Thiel, Boutell & Tanis

[57] ABSTRACT

The present invention provides disazo compounds expressed by the general formula:

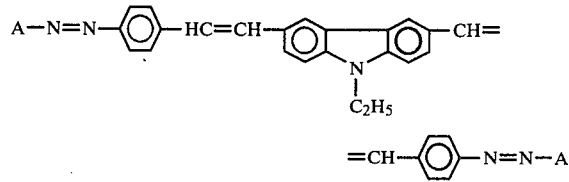

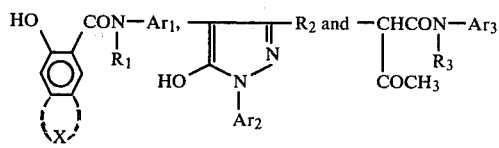

[wherein A represents a member selected from the group consisting of

HO CON—Ar₁, R₂ and —CHCON—Ar₃

(wherein X represents a member selected from the group consisting of aromatic rings such as benzene ring, naphthalene ring, etc., hetero rings such as indole ring, carbazole ring, benzofuran ring, etc. and their substituents, Ar₁ represents a member selected from the group consisting of aromatic rings such as benzene ring, naphthalene ring, etc., hetero rings such as dibenzofuran ring, etc. and their substituents, Ar₂ and Ar₃ represent a member selected from the group consisting of aromatic rings such as benzene ring, naphthalene ring, etc. and their substituents, R₁ and R₃ represent a member selected from the group consisting of hydrogen, lower alkyl radical or phenyl radical and their substituents and R₂ represents a member selected from the group consisting of lower alkyl radical, carboxyl radical and their esters)]; a process for the preparation of said compounds; and electrophotographic sensitive materials having a high sensitivity as well as a high flexibility which comprise a conductive support and a photosensitive layer formed thereon, said photosensitive layer containing said disazo compound as an effective ingredient.

26 Claims, 8 Drawing Figures

DISAZO COMPOUNDS DERIVED FROM 3,6-BIS(STYRYL)-9-ETHYLCARBAZOLE

This is a division of application Ser. No. 921,086, filed June 30, 1978, now U.S. Pat. No. 4,251,614, issued Feb. 17, 1981.

BACKGROUND OF THE INVENTION (a) Field of the Invention

The present invention relates to novel disazo compounds, a process for the preparation of the same, and application of said disazo compounds to electrophotographic sensitive materials.

(b) Description of the Prior Art

It is known that some organic compounds are useful as a photoconductive material for preparing photosensitive materials for use in the electrophotographic process. The "electrophotographic process" herein is one of the image-forming processes which generally comprise first charging a photoconductive sensitive material with electricity by corona discharge or the like in the dark, subsequently subjecting it to image-wise exposure so as to discharge the electric charge of the exposed area selectively, thereby obtaining an electrostatic latent image, and then rendering visible this latent image area by a developing means employing a toner, etc., thereby forming an intended image. And, as the fundamental characteristics required for the photosensitive materials for use in the electrophotographic process, there are enumerated (1) an appropriate chargeability in the dark, (2) a low dischargeability in the dark, and (3) a rapid dischargeability with exposure to light.

As a matter of fact, however, the known organic photoconductive compounds have not always sufficiently satisfied these requirements. As applicable photoconductive materials, there are known inorganic materials such as selenium, zinc oxide, etc., organic materials such as indigo-type compounds, phthalocyanine-type compounds, etc., and others, of which selenium has admittedly been widely put to practical use.

However, with adoption of various processes in the latest electrophotographic process, there is an increasing demand for, for instance, a belt-shaped photosensitive material or the like having the aforementioned fundamental characteristics as well as a satisfactory flexibility with respect to the shape thereof. In this regard, the foregoing selenium is generally difficult to form into a photosensitive material having such a shape as above.

Meanwhile, as the electrophotographic sensitive material prepared by forming a photosensitive layer containing some azo pigment, as an effective ingredient, on a conductive support, such one as prepared by employing monoazo pigment (cf. Japanese Patent Publication No. 16474/1969), one prepared by employing benzidine-type disazo pigment (cf. U.S. Pat. No. 3,898,048, U.S. Pat. No. 4,052,210), etc. are well known. These azo pigments are admittedly useful materials as an effective ingredient of the photosensitive layer as stated above, but when various requirements for photosensitive materials are taken into account from the viewpoint of the electrophotographic process, there has in fact not yet been obtained such a material as will sufficiently meet these requirements. Therefore, it is a matter of more importance to provide a wide variety of pigments, not limited to azo pigments, so as to afford a wide range of selection of pigments acting as an effective ingredient, thereby rendering it possible to provide a photosensitive material apposite to any specific process. In other words, it is desirable for the electrophotographic process that the variety of the pigments useful as an effective ingredient of photosensitive materials be as wide as possible.

Figure 1:
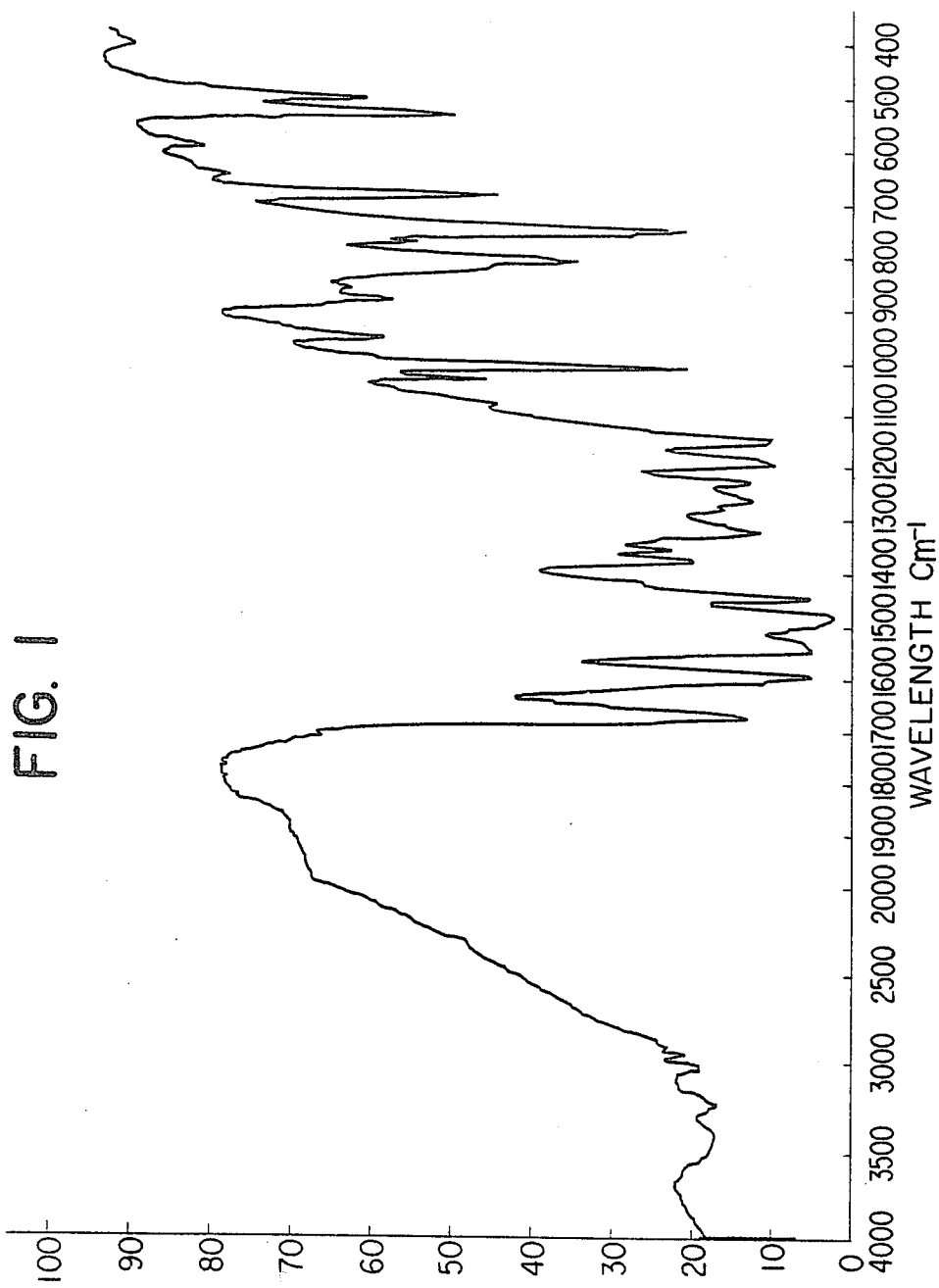
FIG. 1 is a graph which represents the infrared absorption spectrum of the disazo compound No. 1 according to the present invention.

In the drawings, 1 denotes a conductive support, 2,2',2" and 2'" denote respectively a photosensitive layer, 3 denotes a binder, 4 denotes a disazo pigment, 5 denotes a charge-transfer medium, 6 denotes a charge-carrier generating layer, and 7 denotes a charge-transfer medium layer.

SUMMARY OF THE INVENTION

A primary object of the present invention is to provide novel disazo compounds which are free from the drawbacks possessed by the photoconductive substances employed for the aforedescribed photosensitive materials and are especially useful as a photoconductive material, as well as a process for the preparation of said compounds.

Another object of the present invention is to provide electrophotographic sensitive materials having a high sensitivity as well as a high flexibility and which contain a novel disazo pigment, said disazo pigment being selectable from a great variety and useful as an effective ingredient in various electrophotographic processes.

In other words, one embodiment of the present invention is disazo compounds expressed by the general formula I A'—N=N—⟨O⟩—CH=CH—⟨O⟩—⟨O⟩—CH=
                         |
                         N
                         |
                         C₂H₅

=CH—⟨O⟩—N=N—A'

[wherein A' represents

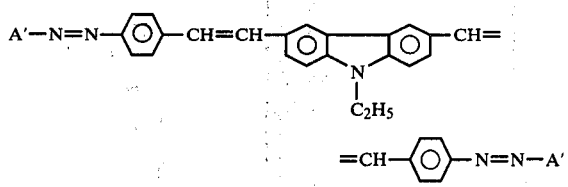

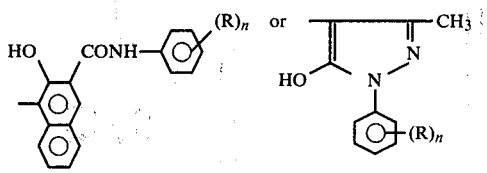

(wherein R represents alkyl radical, alkoxy radical, nitro radical, dialkylamino radical or halogen, n is 0 or an integer of 1, 2 or 3; and R may be either identical or different when n is an integer of 2 or 3)].

These novel disazo compounds are in the form of colored crystals at normal temperature, and shown in the following Table-1 are concrete examples thereof, coupled with their properties represented by elementary analysis value, infrared absorption spectrum data and so forth.

TABLE 1

| Compound No. | Structural formula of disazo compound (melting point) | Elementary analysis value (%) actual value | Elementary analysis value (%) theoretical value | Infrared absorption spectrum ($cm^{-1}$) $\nu C=O$ | Infrared absorption spectrum ($cm^{-1}$) $\delta t$-(CH=CH) | Color tone |
|---|---|---|---|---|---|---|
| 1 | [Disazo structure with CONH-phenyl groups] (250° C. or more) | C 78.58<br>H 4.85<br>N 10.03 | 78.21<br>4.84<br>10.06 | 1675 | 960 | bluish black |
| 2 | [Disazo structure with CONH-phenyl-NO$_2$ groups] (250° C. or more) | C 71.84<br>H 4.40<br>N 11.79 | 70.90<br>4.38<br>11.80 | 1680 | 955 | bluish black |
| 3 | [Disazo structure with CONH-phenyl-OCH$_3$ (ortho) groups] (250° C. or more) | C 76.23<br>H 5.10<br>N 9.43 | 76.15<br>5.03<br>9.26 | 1675 | 960 | bluish black |
| 4 | [Disazo structure with CONH-phenyl-OCH$_3$ (para) groups] (250° C. or more) | C 76.23<br>H 5.10<br>N 9.43 | 76.10<br>5.09<br>9.30 | 1680 | 960 | bluish black |

TABLE 1-continued

| Compound No. | Structural formula of disazo compound (melting point) | Elementary analysis value (%) actual value | Elementary analysis value (%) theoretical value | Infrared absorption spectrum (cm$^{-1}$) $\nu$C=O | Infrared absorption spectrum (cm$^{-1}$) $\delta t$-(CH=CH) | Color tone |
|---|---|---|---|---|---|---|
| 5 | [structure with o-CH$_3$ phenyl CONH groups on both ends, carbazole with C$_2$H$_5$] (250° C. or more) | C 78.65<br>H 5.26<br>N 9.73 | C 78.50<br>H 5.31<br>N 9.58 | 1680 | 960 | bluish black |
| 6 | [structure with p-Cl phenyl CONH groups on both ends, carbazole with C$_2$H$_5$] (250° C. or more) | C 73.28<br>H 4.48<br>N 9.35 | C 73.10<br>H 4.50<br>N 9.34 | 1675 | 960 | bluish black |
| 7 | [structure with p-N(CH$_3$)$_2$ phenyl CONH groups on both ends, carbazole with C$_2$H$_5$] (250° C. or more) | C 76.62<br>H 5.54<br>N 11.83 | C 76.60<br>H 5.51<br>N 11.90 | 1680 | 960 | bluish black |
| 8 | [structure with 2,4-di-OCH$_3$ phenyl CONH groups on both ends, carbazole with C$_2$H$_5$] (250° C. or more) | C 74.11<br>H 5.36<br>N 8.90 | C 74.01<br>H 5.34<br>N 8.72 | 1675 | 960 | bluish black |

TABLE 1-continued

| Compound No. | Structural formula of disazo compound (melting point) | Elementary analysis value (%) | | Infrared absorption spectrum (cm⁻¹) | | Color tone |
|---|---|---|---|---|---|---|
| | | actual value | theoretical value | $\nu$C=O | $\delta t$-(CH=CH) | |
| 9 | (structure shown) (250° C. or more) | C 78.69<br>H 5.69<br>N 9.45 | 78.70<br>5.69<br>9.43 | 1680 | 960 | bluish black |
| 10 | (structure shown) (250° C. or more) | C 69.62<br>H 5.03<br>N 8.36 | 69.51<br>5.01<br>8.32 | 1675 | 960 | bluish black |
| 11 | (structure shown) (250° C. or more) | C 69.62<br>H 5.03<br>N 8.36 | 69.52<br>5.01<br>8.40 | 1675 | 960 | bluish black |
| 12 | (structure shown) (250° C. or more) | C 75.09<br>H 5.13<br>N 15.77 | 74.98<br>5.01<br>15.50 | 1665 | 960 | red |

TABLE 1-continued

| Compound No. | Structural formula of disazo compound (melting point) | Elementary analysis value (%) | | Infrared absorption spectrum (cm$^{-1}$) | | Color tone |
| --- | --- | --- | --- | --- | --- | --- |
| | | actual value | theoretical value | $\nu$C=O | $\delta$t-(CH=CH) | |
| 13 | [structure] (250° C. or more) | C 67.34<br>H 4.60<br>N 17.28 | 67.21<br>4.61<br>17.30 | 1660 | 960 | reddish brown |

In this connection, as a typical example, the infrared absorption spectrum (according to KBr tablet process) of Compound No. 1 among these disazo compounds is shown in FIG. 1.

The foregoing disazo compounds can be prepared through, for instance, the process described below. That is to say, another embodiment of the present invention is a process of preparation of the foregoing novel disazo compounds, which process comprises reacting dialkyl p-nitrobenzyl phosphate expressed by the general formula

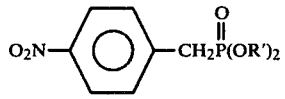

(wherein R' represents lower alkyl radical having 1 to 4 carbon atoms) with 3,6-diformyl-9-ethyl carbazole expressed by the structural formula

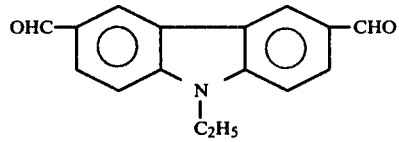

to produce 3,6-bis(4-nitrostyryl)-9-ethyl carbazole expressed by the structural formula

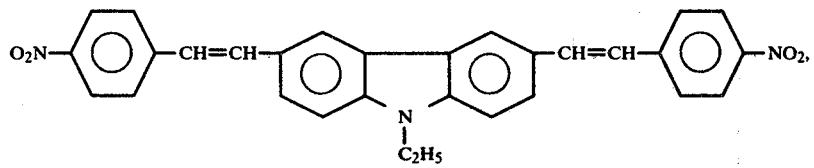

reducing the reaction product into 3,6-bis(4-aminostyryl)-9-ethyl carbazole expressed by the structural formula

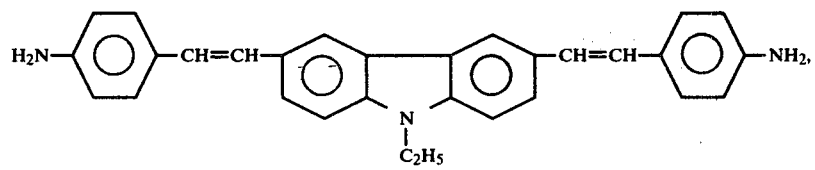

9-ethyl carbazole into tetrazonium salt expressed by the structural formula

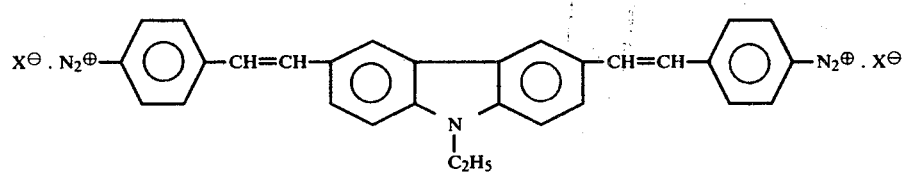

wherein X represents anionic functional radical), and thereafter reacting this tetrazonium salt with a compound expressed by the general formula

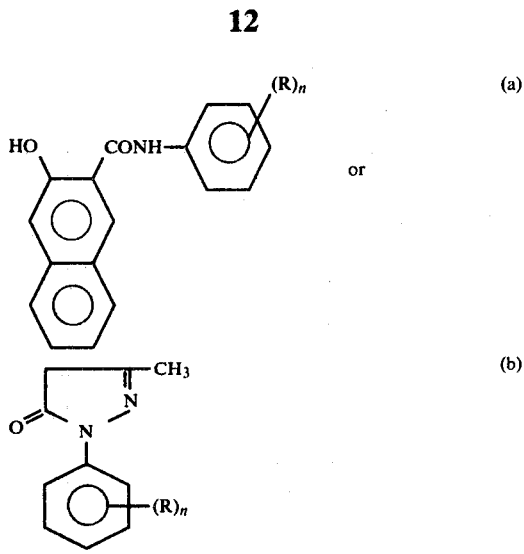

[in both (a) and (b) herein, R represents alkyl radical, alkoxy radical, nitro radical, dialkylamino radical or halogen, n is 0 or an integer of 1, 2 or 3, and R may be either identical or different when n is an integer of 2 or 3)].

3,6-bis(4-nitrostyryl)-9-ethyl carbazole produced through the initial process is also a novel compound, and it can be obtained by reacting dialkyl p-nitrobenzyl phosphate expressed by the foregoing general formula I [cf. Okazaki, Yamaguchi et al., Jour. of Chem. Soc. of Japan, 91, (4) 390 (1970)] with 3,6-diformyl-9-ethyl carbazole under the condition of a temperature in the range of from room temperature to 100° C. or thereabouts within an organic solvent such as methyl alcohol, ethyl alcohol, dioxane, benzene, N,N-dimethyl formamide, dimethyl sulfoxide, N-methyl pyrrolidone, etc. in the presence of a conventional basic catalyst, i.e., alcoholate such as sodium methylate, caustic soda, sodium hydroxide, sodium amide, etc. On this occasion, alkyl p-nitrobenzyl phosphate is applied in the amount of 2 to 5 moles, preferably 2 to 3 moles, per mole of 3,6-diformyl-9-ethyl carbazole.

pigment, as an effective ingredient, which is expressed by the general formula II

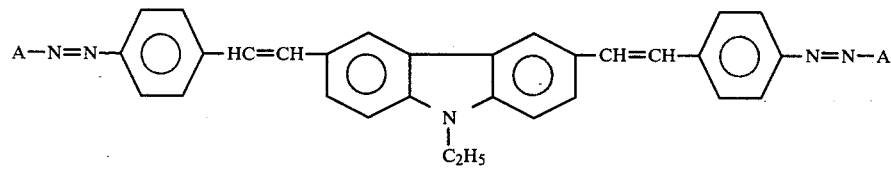

The reduction of the nitro compound progresses quantitatively when reaction is effected for 30 minutes to 2 hours at a temperature of 70° to 110° C. within an organic solvent such as N,N-dimethyl formamide in the presence of a reducing agent such as iron-hydrochloric acid which is popular for use in reducing nitro radicals. 3,6-bis(4-aminostyryl)-9-ethyl carbazole thus obtained is also a novel compound.

Next, diazotization of this amino compound is effected by adding thereto a dilute inorganic acid like dilute hydrochloric acid and dilute sulfuric acid and further adding an aqueous solution of sodium nitrite to the resulting mixture at a temperature of −10° to 10° C. The diazotization reaction completes in 30 minutes to 3 hours. On this occasion, it is preferable to precipitate tetrazonium salt by adding borofluoric acid, for instance, to the reaction mixture and filter the precipitate, thereby obtaining crystals. This tetrazonium salt is also a novel compound.

Subsequently, by adding the foregoing compound (a) or (b) (these may be called "coupling ingredient") in the amount of 1 to 10 moles, preferably 2 to 5 moles, per mole of tetrazonium salt, coupling reaction is effected between said tetrazonium salt and the coupling ingredient. Practically speaking, however, this reaction is performed by first preparing a mixture of said tetrazonium salt and coupling ingredient dissolved in an organic solvent such as N,N-dimethyl formamide, dimethyl sulfoxide, etc. and then adding thereto an aqueous solution of alkali, i.e., an aqueous solution of sodium acetate, dropwise at a temperature of about −10° to 10° C. This reaction completes in 5 to 30 minutes.

Still another embodiment of the present invention is the application of the thus obtained disazo compounds as well as analogues thereof to electrophotographic sensitive materials. That is to say, the photosensitive material according to the present invention is an electrophotographic sensitive material which comprises a conductive support and a photosensitive layer formed thereon, said photosensitive layer containing a disazo

[wherein A represents

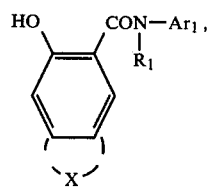

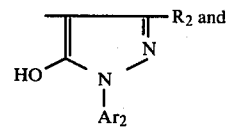

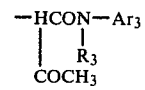

(wherein X represents a member selected from the group consisting of aromatic rings such as benzene ring, naphthalene ring, etc., hetero rings such as indole ring, carbazole ring, benzofuran ring, etc. and their substituents, $Ar_1$ represents a member selected from the group consisting of aromatic rings such as benzene ring, naphthalene ring, etc., hetero rings such as dibenzofuran ring, etc. and their substituents, $Ar_2$ and $Ar_3$ represents a member selected from the group consisting of benzene ring, naphthalene ring, etc. and their substituents, $R_1$ and $R_3$ represent a member selected from the group consisting of hydrogen, lower alkyl radical or phenyl radical and their substituents, and $R_2$ represents a member selected from the group consisting of lower alkyl radical, carboxyl radical and their esters)].

Shown hereunder in terms of structural formula are concrete examples of the compounds expressed by the foregoing general formula II which are useful in the electrophotographic sensitive materials according to the present invention.

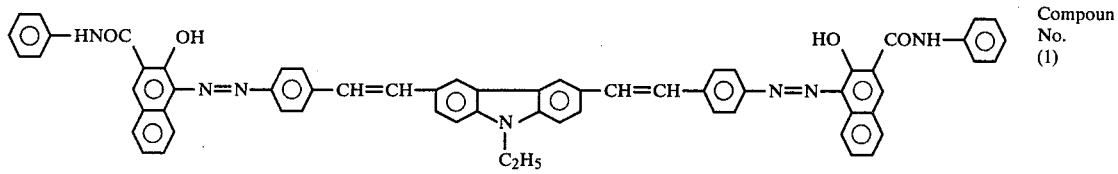

Compound No. (1)

Since the part

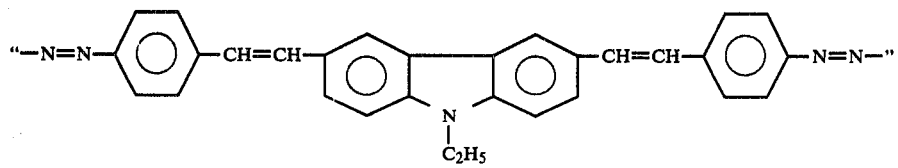
of this structural formula of Compound No. 1 is common to Compound Nos. 2 through 66, it is hereunder represented by "—Y—" for the sake of brevity.
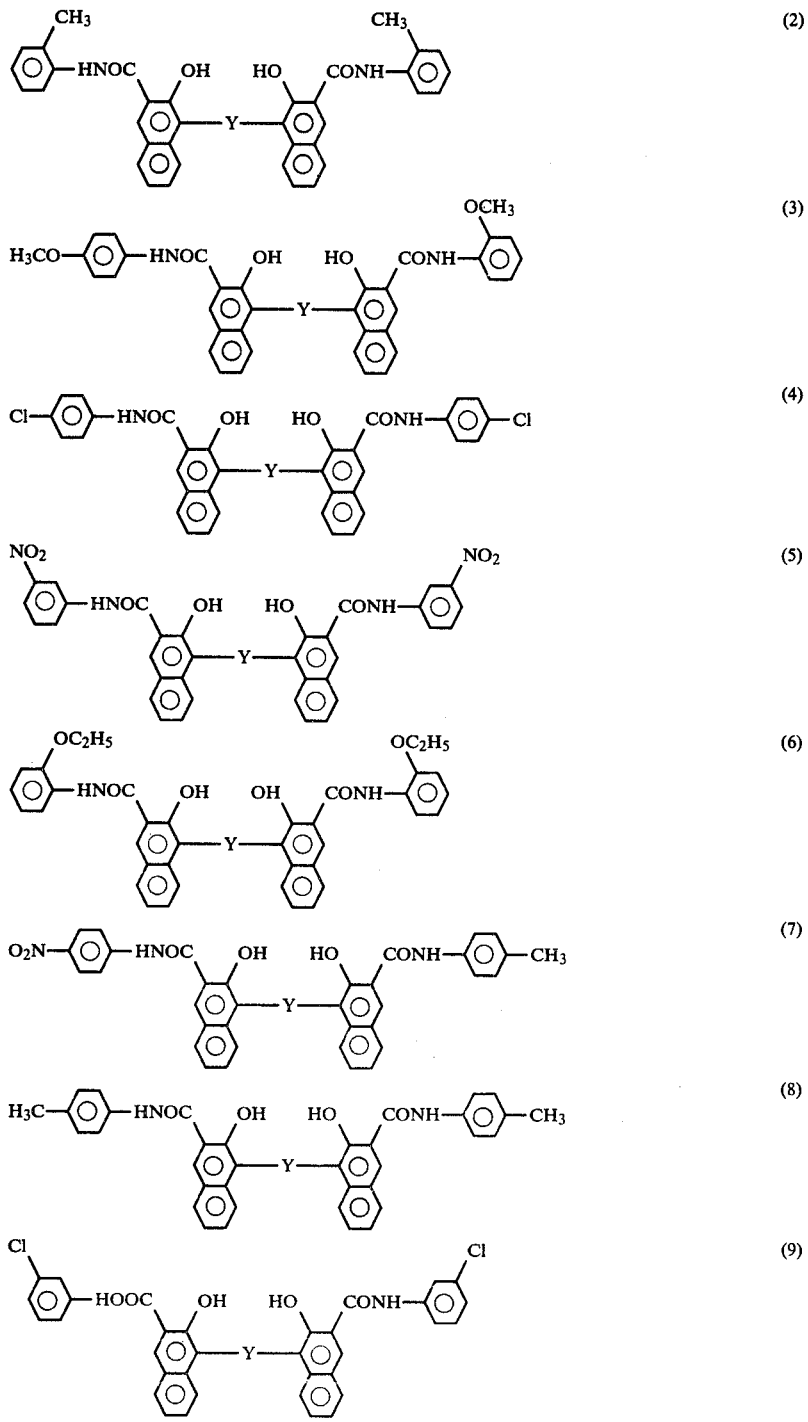

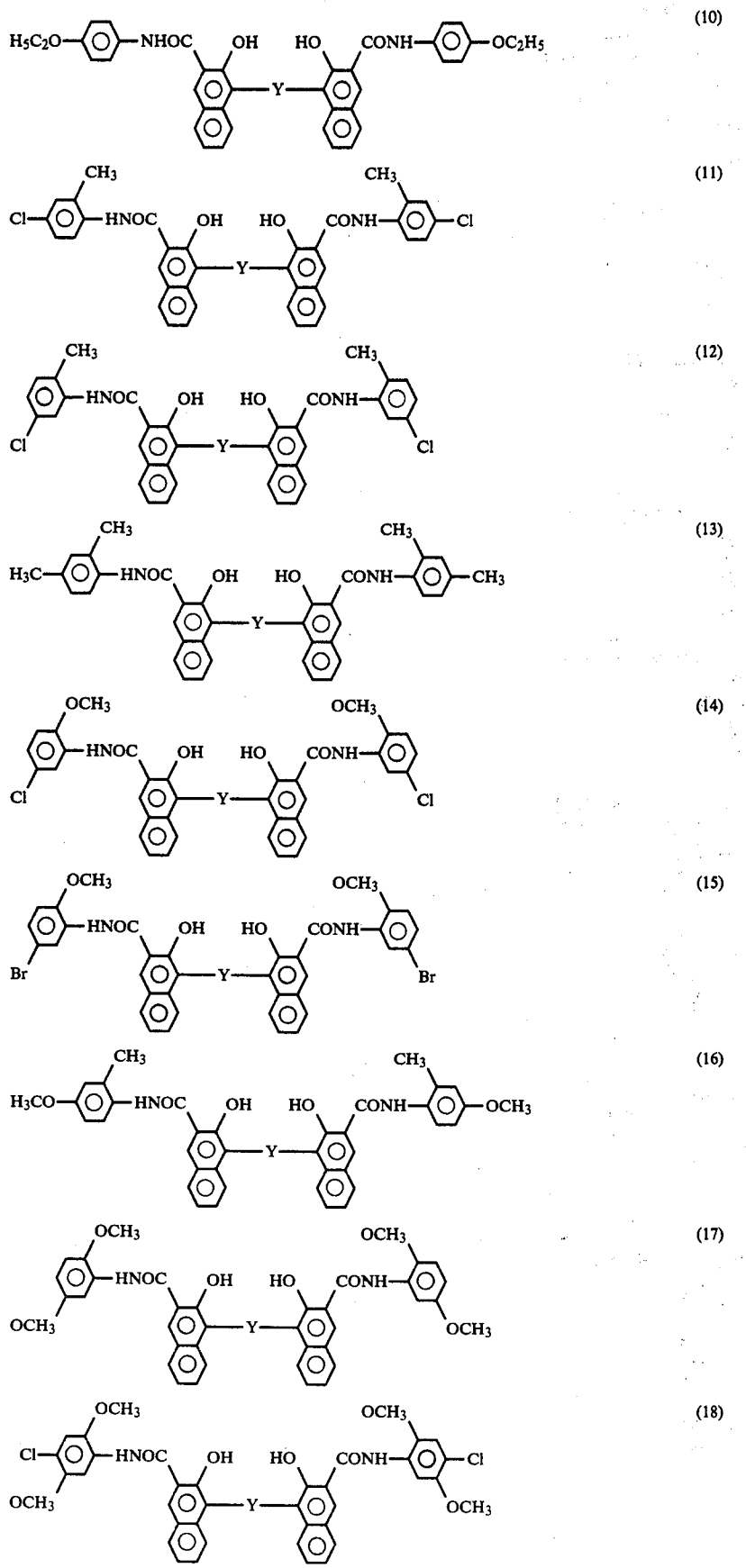

-continued
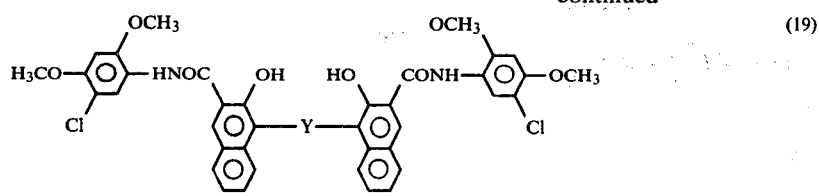 (19)
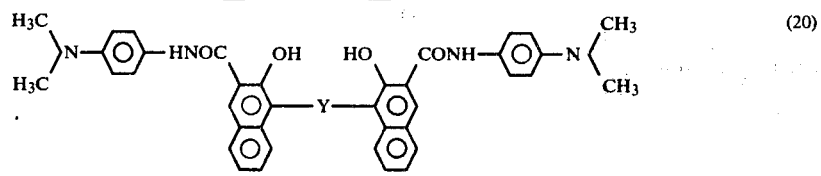 (20)
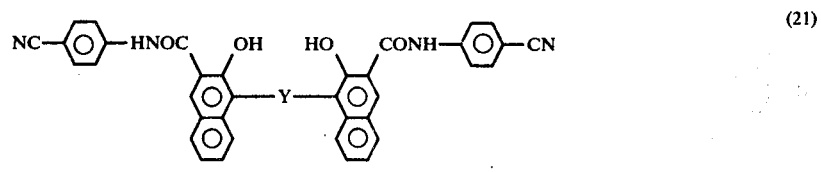 (21)
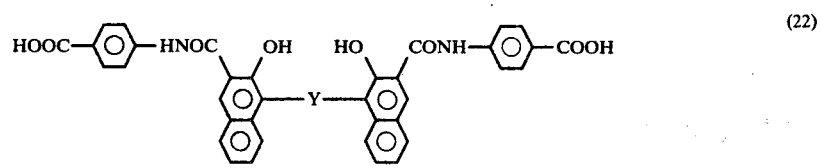 (22)
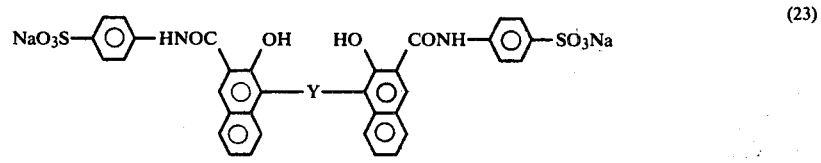 (23)
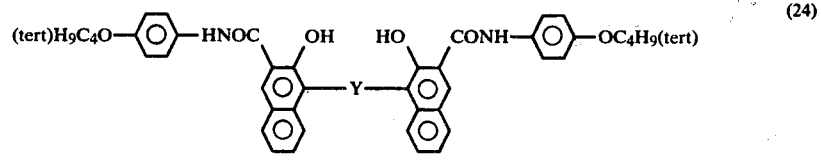 (24)
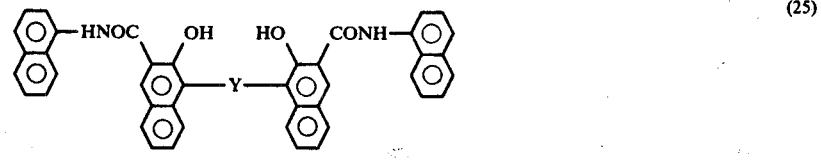 (25)
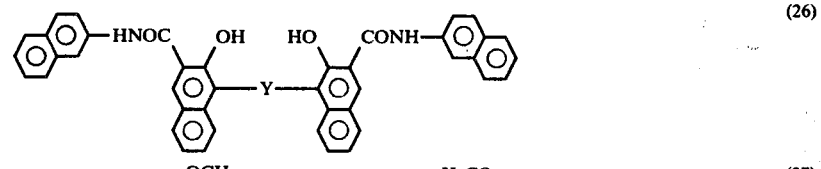 (26)
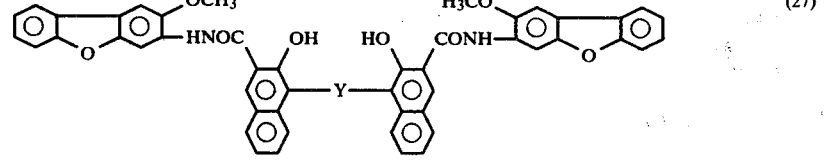 (27)
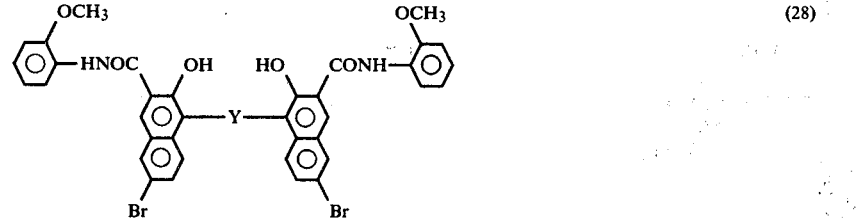 (28)

-continued
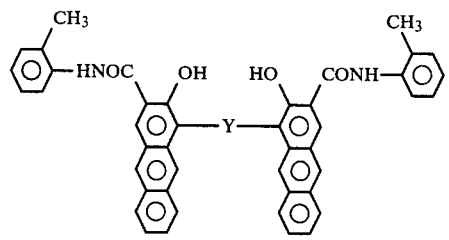
(29)
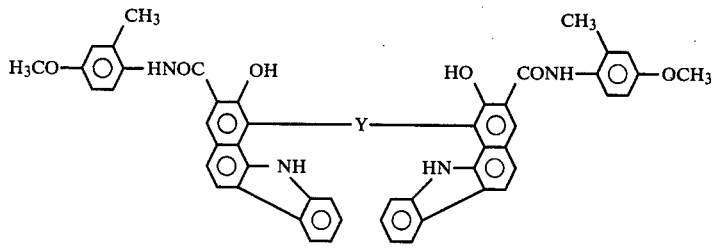
(30)
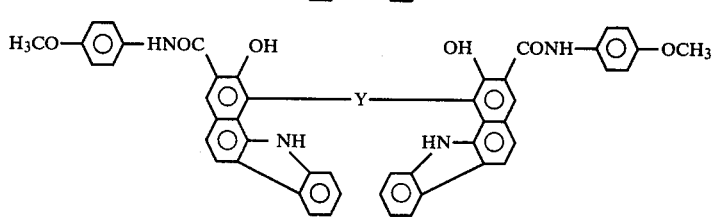
(31)
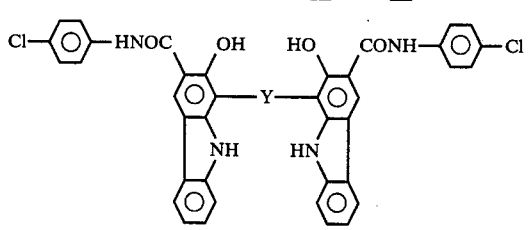
(32)
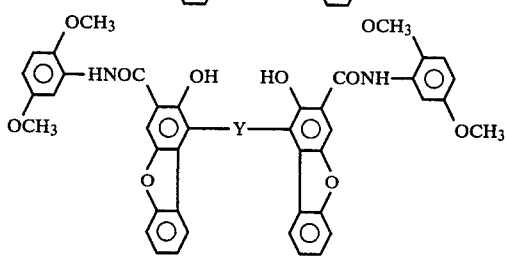
(33)
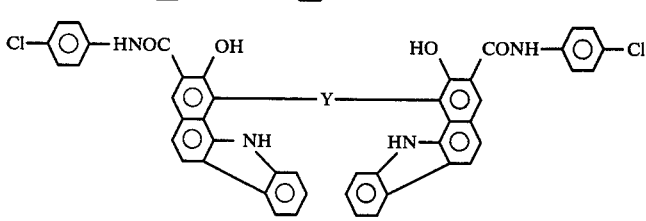
(34)
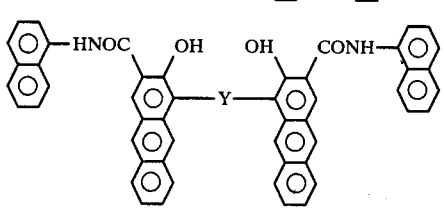
(35)
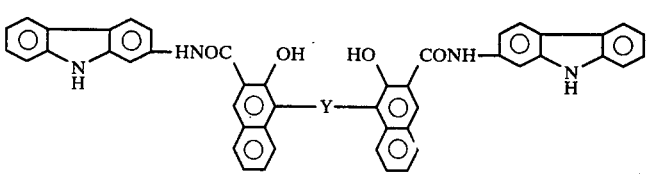
(36)

-continued
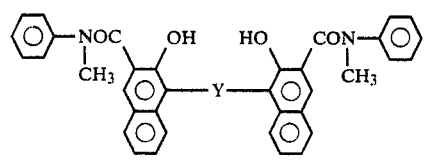 (37)
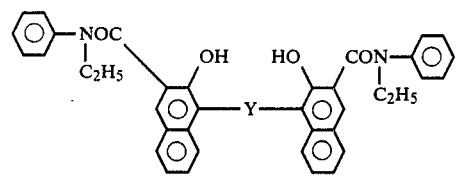 (38)
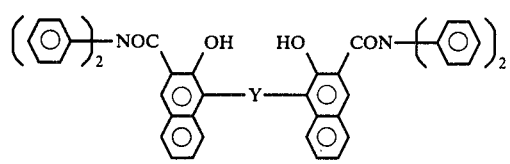 (39)
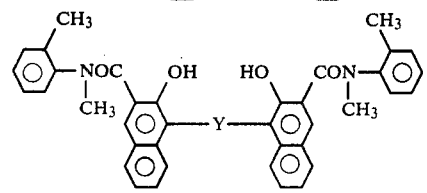 (40)
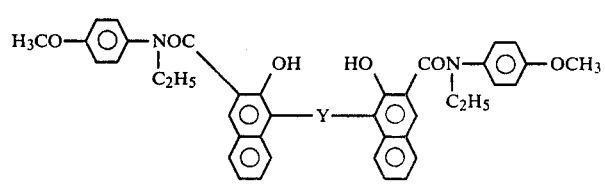 (41)
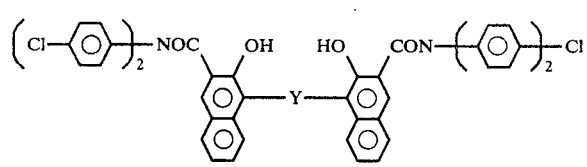 (42)
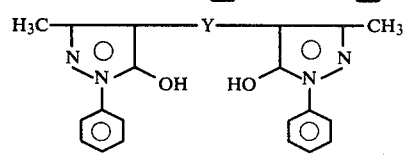 (43)
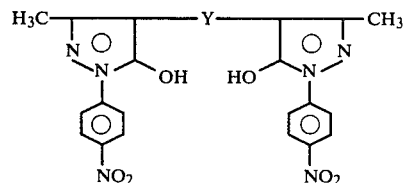 (44)
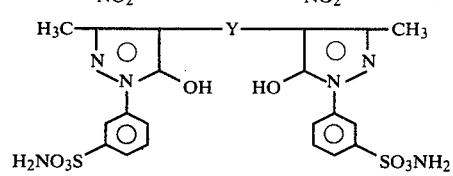 (45)
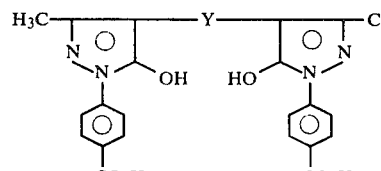 (46)

-continued
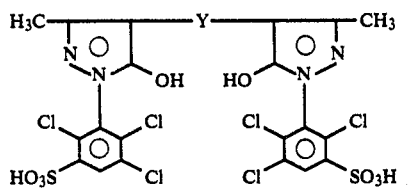 (47)
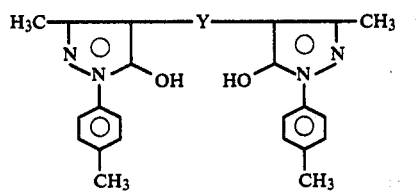 (48)
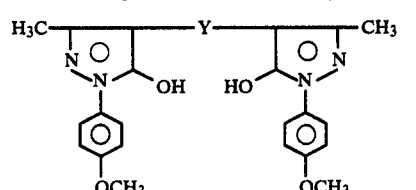 (49)
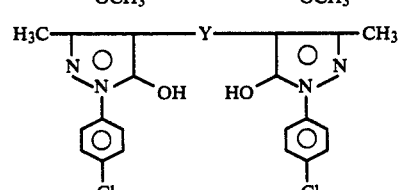 (50)
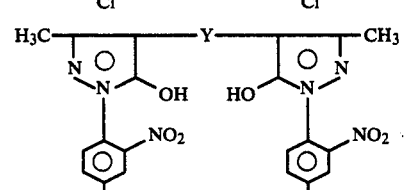 (51)
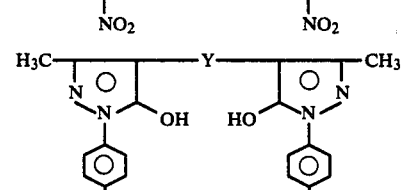 (52)
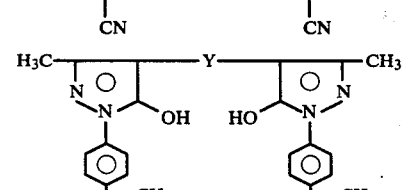 (53)
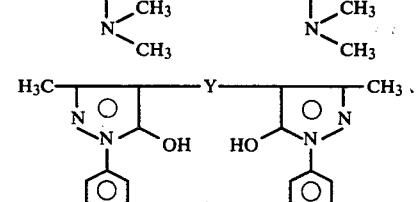 (54)
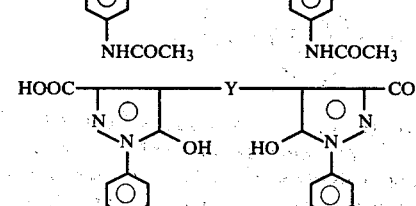 (55)

-continued

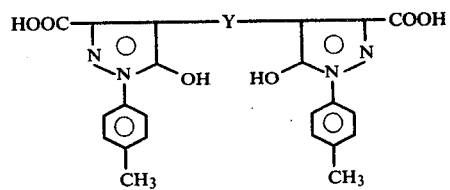
(56)

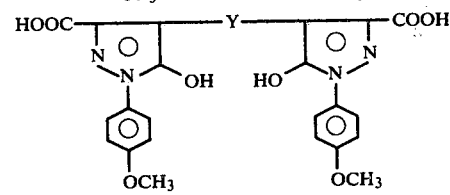
(57)

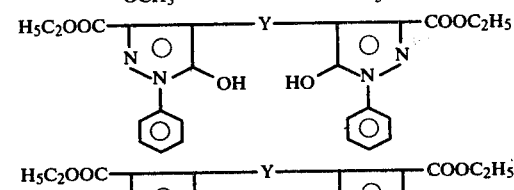
(58)

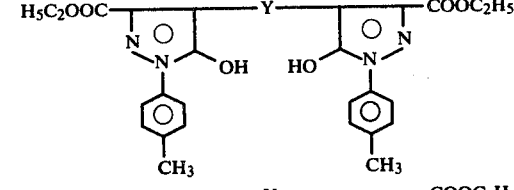
(59)

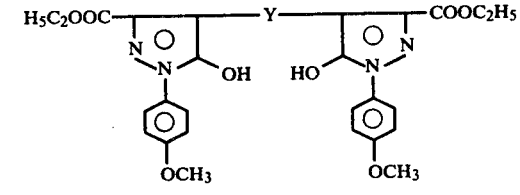
(60)

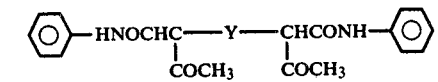
(61)

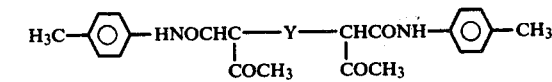
(62)

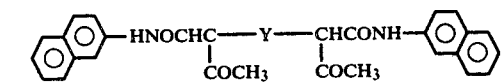
(63)

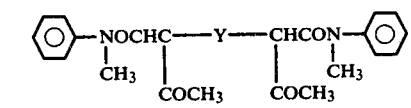
(64)

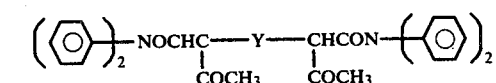
(65)

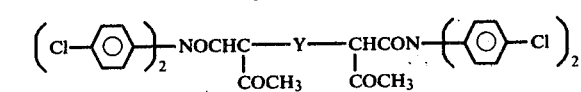
(66)

These disazo pigments can also be prepared through the same process as that for the compounds expressed by the general formula I. That is, these disazo pigments can be easily prepared through the process comprising first reacting dialkyl p-nitrobenzyl phosphate expressed by the structural formula

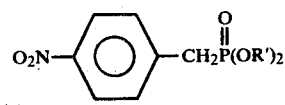

(wherein R' represents lower alkyl radical having 1 to 4 carbon atoms) with 3,6-diformyl-9-ethyl carbazole within an organic solvent such as N,N-dimethyl formamide, etc. in the presence of a base to produce 3,6- bis(4-nitrostyryl)-9-ethyl carbazole expressed by the structural formula

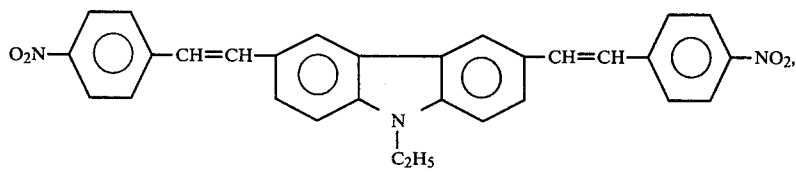

reducing the reaction product into 3,6-bis(4-aminostyryl)-9-ethyl carbazole expressed by the structural formula

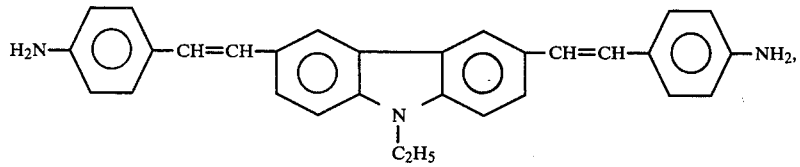

diazotizing this 3,6-bis(4-aminostyryl)-9-ethyl carbazole into tetrazonium salt expressed by the structural formula

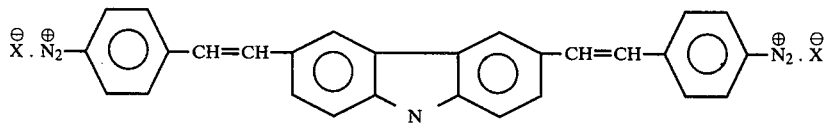

(wherein X represents anionic functional radical) with an aqueous solution of sodium nitrite within a dilute inorganic solvent such as dilute hydrochloric acid, dilute sulfuric acid, etc. and thereafter coupling this tetrazonium salt with a coupler, such as naphthol AS type coupler, corresponding to each of the aforementioned pigments within an appropriate organic solvent such as N,N-dimethyl formamide in the presence of alkali.

Figure 5:
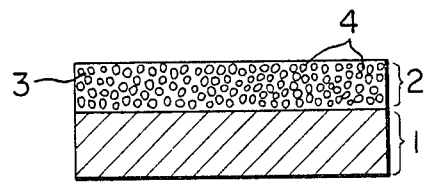
FIGS. 5 through 8 are enlarged cross-sectional views of the respective photosensitive materials according to the present invention.
Figure 6:
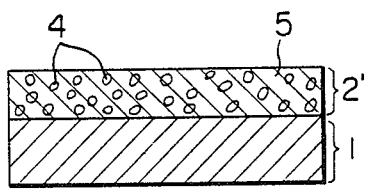
Figure 7:
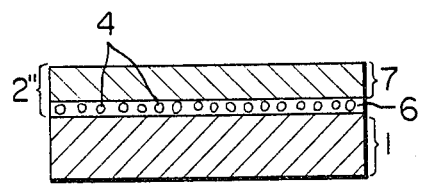
Figure 8:
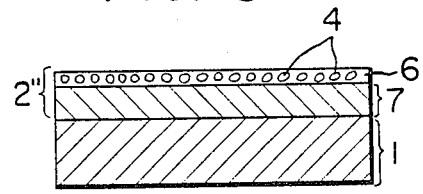

The photosensitive materials according to the present invention contain the above mentioned disazo pigments and can assume such structures as illustrated in FIGS. 5 through 8 depending on the way of application of these pigments. The photosensitive material illustrated in FIG. 5 is one prepared by forming a disazo pigment 4 (which serves herein as a photoconductive substance)-resinous binder 3 type photosensitive layer 2 on a conductive support 1. The photosensitive material illustrated in FIG. 6 is one prepared by forming a disazo pigment 4 (which serves herein as a charge-carrier generating substance)-charge-transfer medium (which is a mixture of a charge-transferable substance and a resinous binder) 5 type photosensitive layer 2' on a conductive support 1. And, the photosensitive material illustrated in FIGS. 7 and 8 is a modification of the photosensitive material in FIG. 2, and the photosensitive layers 2'' and 2''' thereof are composed of a charge-carrier generating layer 6 consisting essentially of a disazo pigment 4 and a charge-transfer medium layer 7.

In the photosensitive material of FIG. 5, the disazo pigment acts as a photoconductive substance, and generation and transfer of the charge-carrier necessary for light decay are performed through the pigment particles. In the case of the photosensitive material of FIG. 6, said charge-transferable substance forms a charge-transfer medium together with said binder (plus a plasticizer as occasion demands), while said disazo pigment acts as a charge-carrier generating substance. This charge-transfer medium does not have any charge-carrier generating ability like disazo pigments, but has an ability to accept and transfer the charge-carrier generated by disazo pigments. That is, in the case of the photosensitive material of FIG. 6, generation of the charge-carrier necessary for light decay is performed by the disazo pigment, while transfer of the charge-carrier is performed mainly by the charge-transfer medium. An essential condition further required for the charge-transfer medium on this occasion is that the scope of absorption wavelength of the charge-transfer medium should not fall on mainly the scope of absorption wavelength of the visible region of the disazo pigment. The reason for this is that, in order to generate the charge carrier efficiently in the disazo pigment, it is necessary to transmit the light to the surface of the pigment. This rule, however, does not apply to the case of, for instance, a photosensitive material which is only sensitive to a specific wavelength. Therefore, the absorption wavelength of the charge-transfer medium and that of the disazo pigment should not completely overlap each other. Next, in the case of the photosensitive material of FIG. 7, the light after passing through the charge-transfer medium layer reaches to the photosensitive layer 2'' constituting a charge-carrier generating layer to cause generation of the charge-carrier in the disazo pigment of this portion, while the charge-transfer medium layer accepts and transfers the charge-carrier pouring therein. The mechanism that generation of the charge-carrier necessary for light decay is performed by the disazo pigment and transfer of the charge-carrier is performed by the charge-transfer medium in this photosensitive material is the same as in the case of the photosensitive material illustrated in FIG. 6. The disazo pigment herein is also a charge-carrier generating substance. Further, the functional mechanism of the charge-transfer medium layer and the charge-carrier generating layer in the photosensitive material of FIG. 8 is the same as in the case of the photosensitive material of FIG. 7.

In order to prepare a photosensitive material of FIG. 5, it suffices to coat a dispersion obtained by dispersing fine particles of a disazo pigment in a binder solution on a conductive support and dry thereafter. In order to prepare the photosensitive material of FIG. 6, it suffices to disperse fine particles of a disazo pigment in a solution obtained by dissolving a charge-transferable substance and a binder, coat the resulting dispersion on a conductive support, and dry thereafter. The photosensitive material of FIG. 7 can be obtained either by depositing a disazo pigment on a conductive support through vacuum evaporation or through the procedure comprising dispersing fine particles of a disazo pigment in an appropriate solvent containing a binder dissolved therein as occasion demands, coating the resulting solution on a conductive support and drying thereafter, subjecting the thus formed photosensitive layer to surface-finishing by, for instance, puff-grinding or the like, if necessary, thereby adjusting the thickness of the coating film, and thereafter coating thereon a solution containing a charge-transferable substance and a binder, followed by drying. In this connection, in the case of preparing the photosensitive material of FIG. 8, it suffices to reverse the order of the formation of layer in the process for preparation of the photosensitive material of FIG. 7. In any case, the disazo pigment for use in the present invention is employed upon pulverizing into a particle size of $5\mu$ or less preferably $2\mu$ or less, by means of a ball-mill or the like. Coating is performed by the conventional means such as doctor blade, wire bar, etc. The thickness of the photosensitive layer in the case of the photosensitive material illustrated in FIGS. 5 and 6 is about 3 to $50\mu$, preferably 5 to $20\mu$. In the case of the photosensitive materials illustrated in FIGS. 7 and 8, the desirable thickness of the charge-carrier generating layer is $5\mu$ or less, preferably $2\mu$ or less, and the thickness of the charge-transfer medium layer is about 3 to $50\mu$, preferably 5 to $20\mu$. In the case of the photosensitive material illustrated in FIG. 5, the appropriate amount of the disazo pigment contained in the photosensitive layer is 30 to 70%, preferably about 50%, based on the weight of the photosensitive layer. (As described in the foregoing, in the case of the photosensitive material of FIG. 5, the disazo pigment acts as a photoconductive substance, and generation and transfer of the charge carrier necessary for light decay are performed through the pigment particles. Therefore, contact between the pigment particles is desirable to be continuous from the photosensitive layer surface to the support. Accordingly, it is desirable that the amount of the disazo pigment with respect to the photosensitive layer is relatively high, but when both the strength and the sensitivity of the photosensitive layer are taken into consideration, it is preferably about 50% by weight.) In the case of the photosensitive material illustrated in FIG. 6, the disazo pigment accounts for 1 to 50 wt.%, preferably 20 wt.% or less, of the photosensitive layer, and the charge-transferable substance accounts for 10 to 95 wt.%, preferably 30 to 90 wt.%, of the photosensitive layer. And, in the case of the photosensitive material illustrated in FIGS. 7 and 8, the amount of the charge-transferable substance with respect to the charge-transfer medium layer is 10 to 95 wt.%, preferably 30 to 90 wt.%, like in the case of the photosensitive layer of the photosensitive material of FIG. 6. Further, in the preparation of all photosensitive materials illustrated in FIGS. 5 through 8, it is possible to employ some plasticizer jointly with the binder.

In the photosensitive materials according to the present invention, as the conductive support, a plate or foil of a metal such as aluminum, etc., a plastic film deposited with a metal such as aluminum, etc. through vacuum evaporation, or a paper processed for conductivity are useful. As applicable binders, there can be cited such condensation resins as polyamide, polyurethane, polyester, epoxide resin, polyketone, polycarbonate, etc. and such vinyl polymers as polyvinyl ketone, polystyrene, poly-N-vinyl carbazole, polyacrylamide, etc.; yet, resins having insulating and adhesive properties are all useful. As applicable plasticizers, there can be cited halogenated paraffin, polybiphenyl chloride, dimethyl naphthalene, dibutyl phthalate, etc. And, to cite applicable charge-transferable substances, as for high molecular substances, there are such vinyl polymers as poly-N-vinyl carbazole, halogenated poly-N-vinyl carbazole, polyvinyl pyrene, polyvinyl indroquinoxaline, polyvinyl dibenzothiophene, polyvinyl anthracene, polyvinyl acridine, etc. and such condensation resins as pyrene-formaldehyde resin, bromopyrene-formaldehyde resin, ethyl carbazole-formaldehyde resin, chloroethyl carbazole-formaldehyde resin, etc., and as for low molecular substances (or monomers), there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrodibenzothiophene-5,5-dioxide, 3-nitrodibenzothiophene-5,5-dioxide, 3,7-dinitrodibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrogenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyanoethylene fluorene, tetrachlorophthalic anhydride, 1-bromopyrene, 1-methylpyrene, 1-ethylpyrene, 1-acetylpyrene, carbazole, N-ethyl carbazole, N-$\beta$-chloroethyl carbazole, N-$\beta$-hydroxyethyl carbazole, 2-phenyl indole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyl oxazole, triphenyl amine, tris(4-diethylaminophenyl)methane, 3,6-bis(dibenzylamino)-9-ethyl carbazole, etc. These charge-transferable substances are employed either singly or as a mixture of two or more of them.

Further, all of the photosensitive materials thus prepared can be provided with an adhesive layer or a barrier layer disposed in between the conductive support and the photosensitive layer as occasion demands. As the material for use in forming these layers, polyamide, nitrocellulose, aluminum oxide, etc. are appropriate, and the thickness of the layers is preferably less than $1\mu$.

In order to perform the copying by using a photosensitive material under the present invention, it suffices to follow the procedure that the photosensitive layer side of the photosensitive matter is electrified and exposed to light, and then developing is conducted, followed by, if necessary, transfer onto paper or the like.

The photosensitive materials under the present invention have excellent advantages such that they are generally high in sensitivity and rich in flexibility.

In the following are shown examples embodying the present invention.

DESCRIPTION OF THE PREFERRED EMBODIMENTS

Example 1. (Preparation of Disazo Compound No. 1 expressed by General Formula I)

Preparation of 3,6-bis(4-nitrostyryl)-9-ethyl carbazole

A mixture consisting of 62 g of diethyl p-nitrobenzyl phosphate, of tert.-butoxide potassium 35 g and 400 ml of N,N-dimethylformamide was thoroughly stirred at room temperature, and then a solution obtained by dissolving 27 g of 3,6-diformyl-9-ethyl carbazole in 200 ml of N,N-dimethyl formamide was gradually added dropwise to the mixture so that the temperature for reaction should not exceed 50° C. After completing the dropping, the mixture was further stirred for 2 hours at room temperature, and was diluted with 400 ml of water subsequent thereto. Then, by adding acetic acid, the reactant was neutralized. Subsequently, the reaction product was filtered, washed in water and dried. The yield was 48 g (yield: 92%), and the melting point of the product was 280° C. or more.

Next, by recrystallizing from N,N-dimethyl formamide, there was obtained 3,6-bis(4-nitrostyryl)-9-ethyl carbazole in the form of orange-colored crystals having a melting point of 300° C. or more.

Elementary analysis value (as $C_{30}H_{23}N_3O_4$):

|  | Theoretical | Experimental |
|---|---|---|
| C (%) | 73.60 | 73.50 |
| H (%) | 4.75 | 4.69 |
| N (%) | 8.59 | 8.60 |

Infrared absorption spectrum (according to KBr tablet process):

| $\nu\ NO_2$ | 1500, 1330 cm$^{-1}$ |
|---|---|
| $\delta$ trans. (CH=CH) | 955 cm$^{-1}$ |

Figure 2:
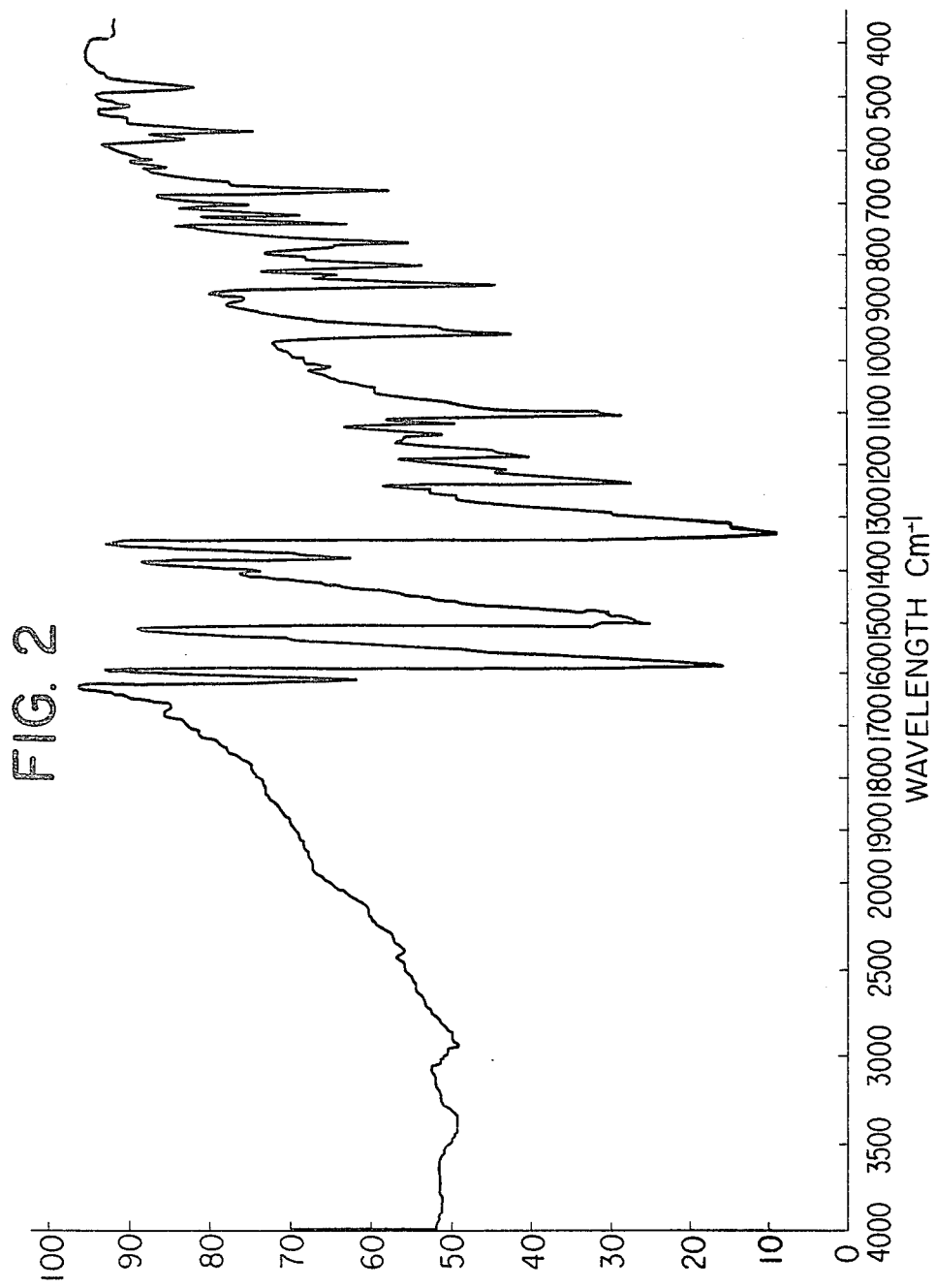
FIGS. 2 through 4 are graphs which respectively represent the infrared absorption spectrum of 3,6-bis(4-nitrostyryl)-9-ethyl carbazole, 3,6-bis(4-aminostyryl)-9-ethyl carbazole and tetrazonium salt thereof.

Shown in FIG. 2 is the infrared absorption spectrum of this crystal.

Preparation of 3,6-bis(4-aminostyryl)-9-ethyl carbazole 20 g of 3,6-bis(4-nitrostyryl)-9-ethyl carbazole were added to a mixture consisting of 30 g of iron powder, 10 ml of concentrated hydrochloric acid, 50 ml of water and 600 ml of N,N-dimethylformamide and subjected to 1.5 hours' intense stirring at a temperature of 80° to 90° C. Thereafter, the pH value was adjusted to be 8 by means of 10% aqueous solution of sodium carbonate while thus heating, and the undissolved matter was filtered. The resulting filtrate, after treating with active carbon, was gradually poured in 600 ml of water, whereby there was obtained yellow crystals of 3,6-bis(4-aminostyryl)-9-ethyl carbazole. The yield of this crystal was 17 g (yield rate: 94%) and the melting point thereof was 260° C. or more.

Elementary analysis value (as $C_{30}H_{27}N_3$):

|  | Theoretical | Experimental |
|---|---|---|
| C (%) | 83.87 | 83.90 |
| H (%) | 6.35 | 6.33 |
| N (%) | 9.78 | 9.75 |

Infrared absorption spectrum (according to KBr tablet process):

| $\nu\ NH$ | 3300 to 3500 cm$^{-1}$ |
|---|---|
| $\delta$ trans. (CH=CH) | 960 cm$^{-1}$ |

Figure 3:
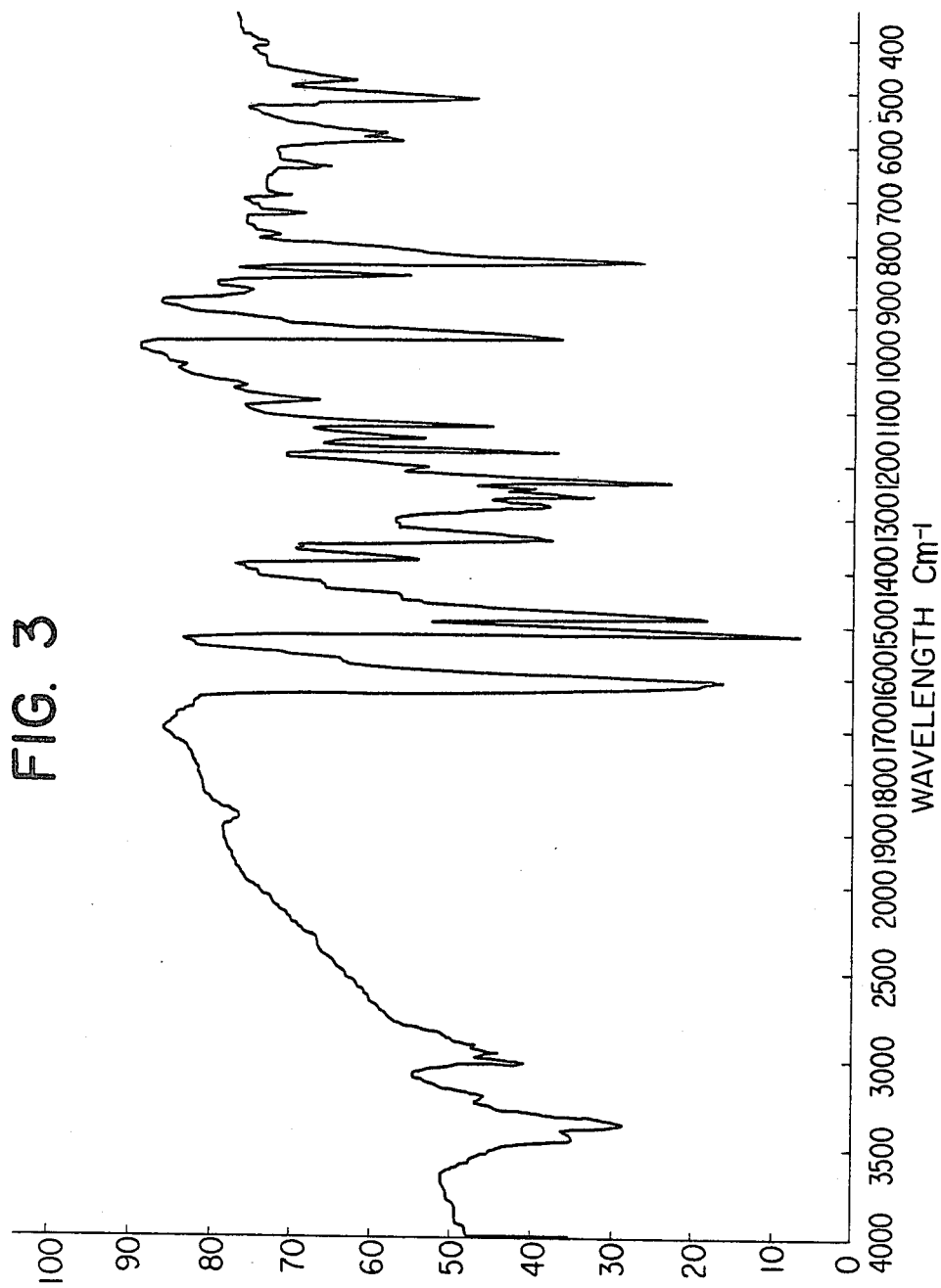

Shown in FIG. 3 is the infrared absorption spectrum of this crystal.

Preparation of disazo compound No. 1 expressed by general formula I 31 g of 3,6-bis(4-aminostyryl)benzene obtained as above were thoroughly stirred within 300 ml of 6 N hydrochloric acid at a temperature of 60° C. for about 30 minutes. The resulting solution was cooled down to 0° C., and a solution obtained by dissolving 10 g of sodium nitrite in 20 ml of water was added dropwise thereto in 40 minutes at a temperature of −5° to 0° C. Subsequently, after stirring the mixture for 30 minutes at the same temperature, 150 ml of water were added, a small amount of unreacted matter was filtered and the resulting filtrate was poured in 100 ml of 42% borofluoric acid, and the crystals separated thereby were collected by filtering, washed in water and dried, whereby there were obtained 32 g (yield rate: 71%) of tetrazonium difluoroborate in the form of dark-red crystals. The decomposition point of this crystal was 130° C. or more.

Infrared absorption spectrum (according to KBr tablet process): $\nu N_2$: 2200 cm$^{-1}$.

Figure 4:
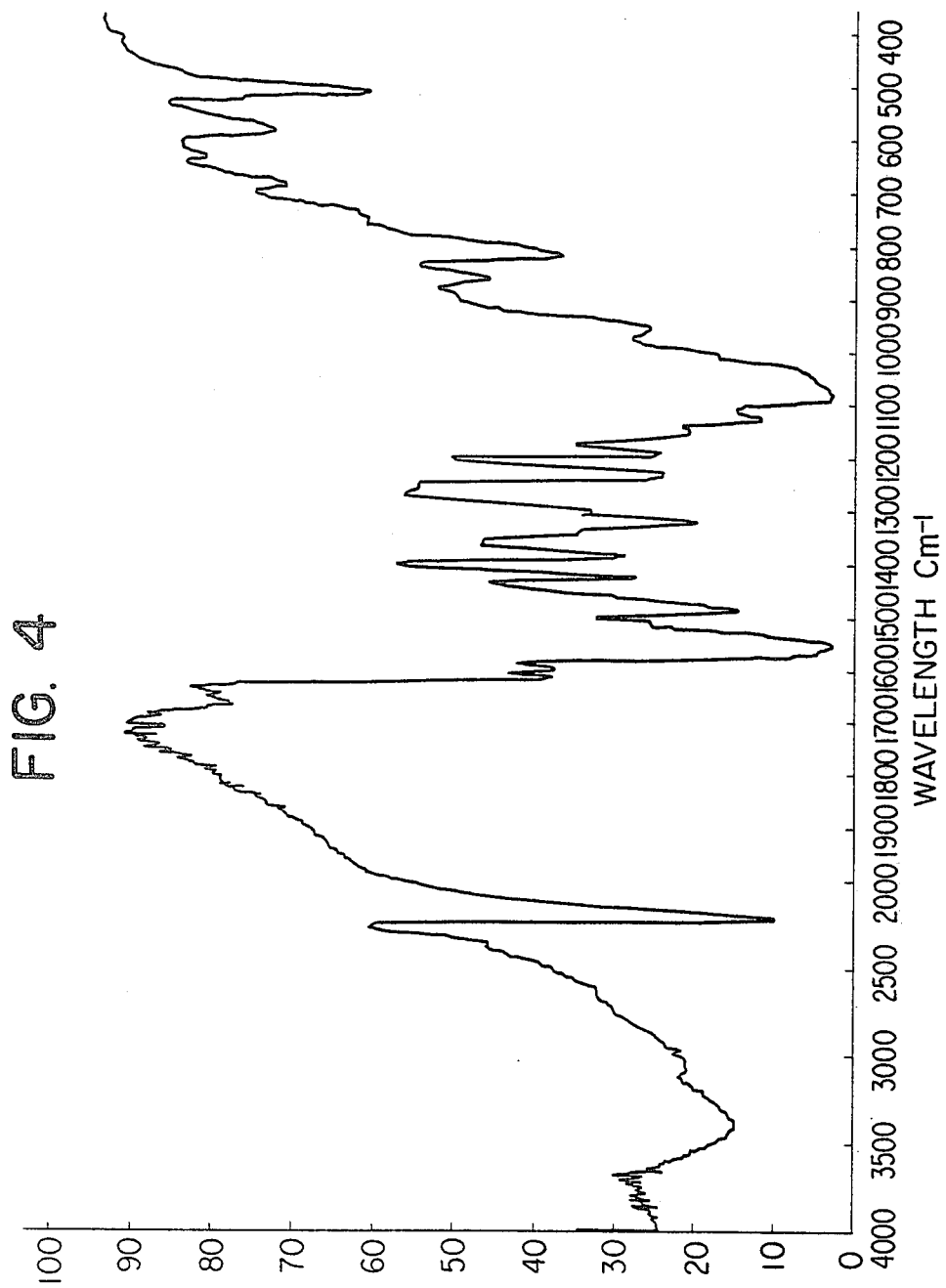

Shown in FIG. 4 is the infrared absorption spectrum of this crystal.

Next, 2.0 g of this tetrazonium salt together with 1.7 g of 2-hydroxy-3-naphthoic acid anilide as coupling ingredient were dissolved in 250 ml of cooled, N,N-dimethyl formamide, and to the resulting solution was added dropwise a solution consisting of 3.2 g of sodium acetate and 50 ml of water in one hour at a temperature of less than 5° C. Thereafter, cooling was discontinued, and 3 hours' stirring was performed at room temperature. The resulting precipitate was collected by filtering, washed 3 times with 300 ml of water, and then rinsed 8 times with 300 ml of N,N-dimethyl formamide. Subsequently, by rinsing out residual N,N-dimethyl formamide with acetone and drying at a temperature of 70° C. and under a reduced pressure of 2 mmHg, there were obtained 2.8 g (yield rate: 90.3%) of a disazo compound corresponding to Compound No. 1.

Examples 2 through 13

Preparation of disazo compound Nos. 2 through 13 (corresponding to Examples 2 through 13, respectively) expressed by general formula I (cf. Table 1)

Through the same procedure as in Example 1 save for the employment of the respective compounds listed in the following Table 2 as coupling ingredient, various disazo compounds No. 2 through No. 13 expressed by the general formula I were prepared.

TABLE 2

| Compound No. | Coupling ingredient | Compound No. | Coupling ingredient |
|---|---|---|---|
| 2 | HO, CONH–C₆H₄–NO₂ (naphthol, NO₂ at meta position) | 8 | HO, CONH–C₆H₃(OCH₃)₂ (2,5-dimethoxy) |
| 3 | HO, CONH–C₆H₄–OCH₃ (ortho) | 9 | HO, CONH–C₆H₃(CH₃)₂ |
| 4 | HO, CONH–C₆H₄–OCH₃ (para) | 10 | HO, CONH–C₆H₂(OCH₃)₂Cl |
| 5 | HO, CONH–C₆H₄–CH₃ | 11 | HO, CONH–C₆H₂(Cl)(OCH₃)₂ |
| 6 | HO, CONH–C₆H₄–Cl | 12 | 3-methyl-1-phenyl-pyrazol-5-one |
| 7 | HO, CONH–C₆H₄–N(CH₃)₂ | 13 | 3-methyl-1-(4-nitrophenyl)-pyrazol-5-one |

Example 14

Preparation of electrophotographic sensitive material 1 part by weight of polyester resin (namely, Polyester Adhesive 49000, the manufacture of Du Pont Inc.), 1 part by weight of the disazo pigment No. 1 expressed by the general formula II and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and such a structure as illustrated in FIG. 5.

Subsequently, after charging positive electricity on the photosensitive layer side of this photosensitive material by applying +6 KV corona discharge for 20 seconds by means of a commercial electrostatic copying paper testing apparatus, the photosensitive material was left alone in the dark for 20 seconds, and the surface potential Vpo (volt) at the time was measured. Next, light was applied to the photosensitive layer by means of a tungsten lamp so as to attain the illumination of 20 luxes on the surface thereof, and time (unit: second) required for reducing said surface potential Vpo to half was sought, whereby the amount of exposure $E_{\frac{1}{2}}$ (lux·sec.) was obtained. The result was as follows:

$Vpo = 750$ V, $E_{\frac{1}{2}} = 21.0$ lux·sec.

Examples 15 through 23

Preparation of electrophotographic sensitive material

Varieties of photosensitive materials were prepared by applying the same procedure as in Example 14 save for employing the respective disazo pigments referred to by number in the following Table 3 in place of the disazo pigment No. 1 expressed by the general formula II which was used in Example 14. When these photosensitive materials were subsequently subjected to the same measurement of Vpo and $E_{\frac{1}{2}}$ as in Example 14, the result was as shown in Table 3, respectively.

TABLE 3

| Example No. | Disazo compound (expressed by general formula II) No. | Vpo (volt) | E1/2 (lux . sec.) |
| --- | --- | --- | --- |
| 15 | 2 | 690 | 10.2 |
| 16 | 5 | 700 | 13.2 |
| 17 | 13 | 750 | 9.7 |
| 18 | 17 | 800 | 6.0 |
| 19 | 25 | 735 | 9.0 |
| 20 | 32 | 650 | 21.0 |
| 21 | 39 | 680 | 18.5 |
| 22 | 53 | 720 | 17.0 |
| 23 | 65 | 690 | 29.5 |

Example 24

Preparation of electrophotographic sensitive material 10 parts by weight of polyester resin (the same as in Example 14), 10 parts by weight of 2,4,7-trinitro-9-fluorenone, 2 parts by weight of the disazo pigment No. 1 expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 seconds, whereby there was obtained a photosensitive material having a 10μ-thick photosensitive layer and such a structure as illustrated in FIG. 6. Subsequently, measurement of Vpo and E½ of this photosensitive material was conducted through the same procedure as in Example 14 save for applying −6 KV corona discharge instead of +6 KV corona discharge employed in Example 14. The result was as follows:

$Vpo=520\ V,\ E\frac{1}{2}=$ lux·sec.

Examples 25 through 33

Preparation of electrophotographic sensitive materials

Varieties of photosensitive materials having a structure illustrated in FIG. 6 were prepared by applying the same procedure as in Example 24 save for employing the respective disazo pigments referred to by number in the following Table 4 in place of the disazo pigment expressed by the general formula II which was used in Example 24. When these photosensitive materials were subsequently subjected to the same measurement of Vpo and E½ as in Example 24, the result was as shown in Table 4, respectively.

TABLE 4

| Example No. | Disazo pigment (expressed by general formula II) No. | Vpo (volt) | E1/2 (lux . sec.) |
| --- | --- | --- | --- |
| 25 | 3 | 490 | 9.0 |
| 26 | 10 | 510 | 10.5 |
| 27 | 12 | 620 | 7.5 |
| 28 | 20 | 500 | 21.0 |
| 29 | 30 | 530 | 8.0 |
| 30 | 37 | 480 | 30.0 |
| 31 | 48 | 520 | 25.1 |
| 32 | 52 | 500 | 20.0 |
| 33 | 60 | 600 | 19.5 |

EXAMPLE 34

Preparation of electrophotographic sensitive material 10 parts by weight of polyester resin (the same as in Example 14), 10 parts by weight of 2,5-bis(4-diethylaminophenyl)-1,4,4-oxadiazole, 2 parts by weight of the disazo pigment No. 1 expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 seconds, whereby there was prepared a photosensitive material having a 10μ-thick photosensitive layer and a structure illustrated in FIG. 6. When this photosensitive material was subsequently subjected to the same measurement as in Example 14, the result was as follows:

$Vpo=900\ V,\ E\frac{1}{2}=7.5$ lux·sec.

EXAMPLES 35 THROUGH 43

Preparation of electrophotographic sensitive materials

Varieties of photosensitive materials having a structure illustrated in FIG. 6 were prepared by applying the same procedure as in Example 34 save for employing the respective disazo pigments referred to by number in the following Table 5 in place of the disazo pigment No. 1 expressed by the general formula II which was used in Example 34. When these photosensitive materials were subsequently subjected to the same measurement of Vpo and E½ as in Example 14, the result was as shown in Table 5, respectively.

TABLE 5

| Example No. | Disazo pigment (expressed by general formula II) No. | Vpo (volt) | E1/2 (lux . sec.) |
| --- | --- | --- | --- |
| 35 | 8 | 850 | 8.9 |
| 36 | 9 | 900 | 4.9 |
| 37 | 15 | 1000 | 10.5 |
| 38 | 22 | 950 | 25.0 |
| 39 | 35 | 920 | 6.0 |
| 40 | 40 | 890 | 19.4 |
| 41 | 42 | 870 | 15.0 |
| 42 | 55 | 900 | 30.0 |
| 43 | 64 | 910 | 22.5 |

EXAMPLE 44

Preparation of electrophotographic sensitive material 200 parts by weight of poly-N-vinyl carbazole, 33 parts by weight of 2,4,7-trinitro-9-fluorenone, 20 parts by weight of polyester resin (the same as in Example 14) and 20 parts by weight of the disazo pigment No. 1 expressed by the general formula II as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and then at a temperature of 120° C. for 5 minutes, whereby there was prepared a photosensitive material having a 13μ-thick photosensitive layer and a structure illustrated in FIG. 6. When this photosensitive material was subjected to the same measurement as in Example 14, the result was as follows:

$Vpo=980\ V,\ E\frac{1}{2}=9.2$ lux·sec.

EXAMPLES 45 THROUGH 53

Preparation of electrophotographic sensitive materials

Varieties of photosensitive materials having a structure illustrated in FIG. 6 were prepared by applying the same procedure as in Example 14 save for employing the respective disazo pigments referred to by number in the following Table 6 in place of the disazo pigment No. 1 expressed by the general formula II which was used in Example 44. When these photosensitive materials were subsequently subjected to the same measurement of $V_{po}$ and $E_{\frac{1}{2}}$ as in Example 14, the result was as shown in Table 6, respectively.

TABLE 6

| Example No. | Disazo pigment (expressed by general formula II) No. | Vpo (volt) | E1/2 (lux . sec.) |
|---|---|---|---|
| 45 | 7 | 890 | 18.5 |
| 46 | 11 | 970 | 3.5 |
| 47 | 17 | 1000 | 2.8 |
| 48 | 28 | 890 | 6.5 |
| 49 | 34 | 1000 | 11.0 |
| 50 | 47 | 910 | 25.5 |
| 51 | 51 | 880 | 19.8 |
| 52 | 61 | 950 | 30.5 |
| 53 | 66 | 1050 | 21.0 |

EXAMPLE 54

Preparation of electrophotographic sensitive material 2 parts by weight of the disazo pigment No. 1 expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite, the manufacture of TEIJIN Co., Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 7. When the thus obtained photosensitive material was subjected to the same measurement as in Example 14, the result was as follows:

$V_{po} = 890$ V, $E_{\frac{1}{2}} =$ lux·sec.

EXAMPLES 55 THROUGH 63

Preparation of electrophotographic sensitive materials

Varieties of photosensitive materials having a structure illustrated in FIG. 7 were prepared by applying the same procedure as in Example 54 save for employing the respective disazo pigments referred to by number in the following Table 7 in place of the disazo pigment expressed by the general formula II which was used in Example 54. When these photosensitive materials were subjected to the same measurement of Vpo and $E_{\frac{1}{2}}$ as in Example 14, the result was as shown in Table 7, respectively.

TABLE 7

| Example No. | Disazo pigment (expressed by general formula II) No. | Vpo (volt) | E1/2 (lux . sec.) |
|---|---|---|---|
| 55 | 4 | 890 | 7.5 |
| 56 | 6 | 900 | 10.7 |
| 57 | 14 | 900 | 5.8 |
| 58 | 16 | 915 | 9.5 |

TABLE 7-continued

| Example No. | Disazo pigment (expressed by general formula II) No. | Vpo (volt) | E1/2 (lux . sec.) |
|---|---|---|---|
| 59 | 21 | 895 | 15.0 |
| 60 | 31 | 850 | 12.5 |
| 61 | 41 | 905 | 21.0 |
| 62 | 54 | 910 | 33.0 |
| 63 | 62 | 890 | 30.4 |

EXAMPLE 64

Preparation of electrophotographic sensitive material 2 parts by weight of the disazo pigment No. 1 expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as in Example 54) and 46 parts by weight of tetrahydrofuran together, and this dispersion was coated on the foregoing charge-carrier generating layer by means of a doctor blade and then dried at a temperature of 120° C. for 10 minutes so as to form a 10μ-thick charge-transfer medium layer, whereby there was obtained a laminate type photosensitive material illustrated in FIG. 7. When the thus obtained photosensitive material was subjected to the same measurement of Vpo and $E_{\frac{1}{2}}$ as in Example 14, the result was as follows:

$V_{po} = 1050$ V, $E_{\frac{1}{2}} = 6.2$ lux·sec.

EXAMPLES 65 THROUGH 73

Preparation of electrophotographic sensitive materials

Varieties of photosensitive materials having the same structure as that of Example 64 were prepared by employing the respective disazo pigments referred to by number in the following Table 8 in place of the disazo pigment expressed by the general formula which was used in Example 64. When these photosensitive materials were subjected to the same measurement of Vpo and $E_{\frac{1}{2}}$ as in Example 14, the result was as shown in Table 8, respectively.

TABLE 8

| Example No. | Disazo pigment (expressed by general formula II) No. | Vpo (volt) | E1/2 (lux . sec.) |
|---|---|---|---|
| 65 | 7 | 950 | 21.0 |
| 66 | 17 | 1100 | 4.2 |
| 67 | 19 | 1000 | 11.0 |
| 68 | 27 | 990 | 21.0 |
| 69 | 29 | 980 | 5.5 |
| 70 | 44 | 900 | 18.5 |
| 71 | 47 | 930 | 25.0 |
| 72 | 54 | 955 | 20.4 |
| 73 | 61 | 1100 | 19.5 |

EXAMPLE 74

Preparation of electrophotographic sensitive material 2 parts by weight of 2,5-bis(4-diethylaminophenyl)-1,3,4-oxadiazole, 2 parts by weight of polycarbonate (the same as in Example 54) and 46 parts by weight of tetrahydrofuran were mixed together, and the resulting solution was coated, by means of a doctor blade, on a polyester film deposited with aluminum through vacuum evaporation and was dried at a temperature of 120° C. for 10 minutes, whereby there was formed a 10μ-thick charge-transfer medium layer. Meanwhile, 2 parts by weight of the disazo pigment No. 1 expressed by the general formula II, 2 parts by weight of polycarbonate and 98 parts by weight of tetrahydrofuran were pulverized and mixed together within a ball-mill, and the resulting dispersion was coated, by means of a doctor blade, on the foregoing charge-transfer medium layer and was dried at a temperature of 100° C. for 10 minutes so as to form a 1μ-thick charge-carrier generating layer, whereby there was obtained a laminate type photosensitive material illustrated in FIG. 8.

When the thus prepared photosensitive material was subjected to the same measurement as in Example 14 as well as applying +6KV corona discharge, the result was as follows:

$Vpo = 950$ V, $E\frac{1}{2} = 7.5$ lux·sec.

EXAMPLES 75 THROUGH 83

Preparation of electrophotographic sensitive materials

Varieties of photosensitive materials were prepared by employing the respective disazo pigments referred to by number in the following Table 9 in place of the disazo pigment No. 1 expressed by the general formula II which was used in Example 74. When these photosensitive materials were subjected to the same measurement of Vpo and $E\frac{1}{2}$ as in Example 14, the result was as shown in Table 9, respectively.

TABLE 9

| Example No. | Disazo pigment (expressed by general formula II) No. | Vpo (volt) | E1/2 (lux . sec.) |
|---|---|---|---|
| 75 | 3 | 980 | 5.2 |
| 76 | 8 | 950 | 8.5 |
| 77 | 10 | 960 | 10.0 |
| 78 | 12 | 1000 | 9.0 |
| 79 | 19 | 980 | 15.0 |
| 80 | 31 | 960 | 8.0 |
| 81 | 40 | 950 | 19.5 |
| 82 | 43 | 1050 | 12.5 |
| 83 | 50 | 970 | 18.5 |

What is claimed is:

1. A disazo compound having the formula

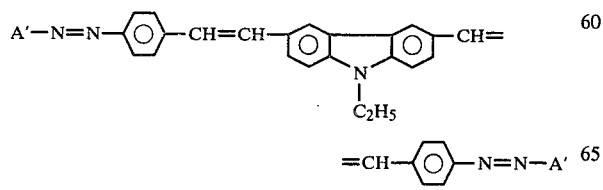

in which A' is

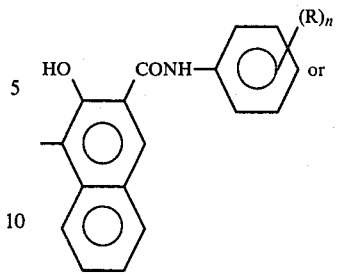

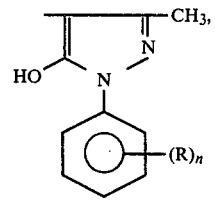

wherein R is alkyl, alkoxy, nitro, dialkylamino or halogen, n is zero or the integer 1, 2 or 3, and R is either the same or different when n is the integer 2 or 3.

2. A disazo compound according to claim 1 in which A' is

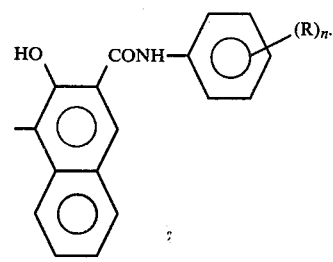

3. A disazo compound according to claim 2 in which n is zero.

4. A disazo compound according to claim 2 in which R is alkyl.

5. A disazo compound according to claim 2 in which n is 1.

6. A disazo compound according to claim 5 in which R is o—CH$_3$ or p—CH$_3$.

7. A disazo compound according to claim 2 in which n is 2.

8. A disazo compound according to claim 7 in which R is o—CH$_3$ and p—CH$_3$.

9. A disazo compound according to claim 2 in which R is alkoxy.

10. A disazo compound according to claim 5 in which R is selected from the group consisting of o—OCH$_3$, o—C$_2$H$_5$, p—OCH$_3$, p—OC$_2$H$_5$ and p—OC$_4$H$_9$ (tert).

11. A disazo compound according to claim 7 in which R is o—OCH$_3$ and m—OCH$_3$.

12. A disazo compound according to claim 2 in which R is nitro.

13. A disazo compound according to claim 5 in which R is m—NO$_2$ or p—NO$_2$.

14. A disazo compound according to claim 2 in which R is dialkylamino.

15. A disazo compound according to claim 5 in which R is p—N(CH$_3$)$_2$.

16. A disazo compound according to claim 2 in which R is halogen.

17. A disazo compound according to claim 5 in which R is m—Cl or p—Cl.

18. A disazo compound according to claim 7 in which R is selected from the group consisting of (1) o—CH₃ and p—Cl, (2) o—CH₃ and m—Cl, (3) o—OCH₃ and m—Cl, (4) o—OCH₃ and m-Br, and (5) o—CH₃ and p—OCH₃.

19. A disazo compound according to claim 2 in which n is 3.

20. A disazo compound according to claim 19 in which R is 2,5-dimethoxy-4-chloro.

21. A disazo compound according to claim 19 in which R is 2,4-dimethoxy-5-chloro.

22. A disazo compound according to claim 1 in which A' is

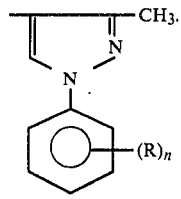

23. A disazo compound according to claim 22 in which n is zero.

24. A disazo compound according to claim 22 in which n is 1.

25. A disazo compound according to claim 24 in which R is selected from the group consisting of p—NO₂, p—CH₃, p—OCH₃, p—Cl and p—N(CH₃)₂.

26. A disazo compound according to claim 22 in which (R)ₙ is o—NO₂ and p—NO₂.

* * * * *